(12) United States Patent
Metzgen

(10) Patent No.: US 7,441,105 B1
(45) Date of Patent: Oct. 21, 2008

(54) REDUCING MULTIPLEXER CIRCUITRY FOR OPERAND SELECT LOGIC ASSOCIATED WITH A PROCESSOR

(75) Inventor: Paul Metzgen, Chiswick (GB)

(73) Assignee: Altera Corporation, San Jose, CA (US)

( * ) Notice: Subject to any disclaimer, the term of this patent is extended or adjusted under 35 U.S.C. 154(b) by 262 days.

(21) Appl. No.: 10/870,749

(22) Filed: Jun. 16, 2004

Related U.S. Application Data

(60) Provisional application No. 60/534,043, filed on Jan. 2, 2004.

(51) Int. Cl.
G06F 7/38 (2006.01)
G06F 9/00 (2006.01)
G06F 9/44 (2006.01)
G06F 15/00 (2006.01)

(52) U.S. Cl. ...................... 712/220
(58) Field of Classification Search ............... 712/220
See application file for complete search history.

(56) References Cited

U.S. PATENT DOCUMENTS 4,104,720 A * 8/1978 Gruner ................. 712/248
6,615,341 B2 * 9/2003 Sih et al. ............... 712/221

OTHER PUBLICATIONS

Computer Organization and Design by Hennessy and Patterson.*
"Coding for Synthesis" http://toolbox.xilinx.com/docsan/xilinx4/data/docs/sim/coding5.html, Jul. 18, 2005, pp. 1-6.

* cited by examiner

*Primary Examiner*—Eddie P Chan
*Assistant Examiner*—Brian P Johnson
(74) *Attorney, Agent, or Firm*—Weaver Austin Villeneuve & Sampson LLP

(57) ABSTRACT

Methods and apparatus are provided for reducing the amount of resources allocated for handling multiplexing in a processor. Characteristics associated with processing blocks are analyzed. Operand restrictions and register groups can be configured to allow the use of more resource efficient multiplexing circuitry in a processor.

28 Claims, 10 Drawing Sheets

Figure 2

| MAC(L) 201 | MAC(R) 203 | ALU(L) 205 | ALU(R) 207 |
|---|---|---|---|
| R0123 | R0123 | R0123 | R0123 |
| R0123 | R0123 | R0123 | R4567 |
| R0123 | R0123 | R4567 | R0123 |
| R0123 | R0123 | R4567 | R4567 |
| R0123 | R4567 | R0123 | R0123 |
| R0123 | R4567 | R0123 | R4567 |
| R0123 | R4567 | R4567 | R0123 |
| R0123 | R4567 | R4567 | R4567 |
| R4567 | R4567 | R0123 | R0123 |
| R4567 | R4567 | R0123 | R4567 |
| R4567 | R4567 | R4567 | R0123 |
| R4567 | R4567 | R4567 | R4567 |

Figure 3

| | MAC(L) 301 | MAC(R) 303 | ALU(L) 305 | ALU(R) 307 |
|---|---|---|---|---|
| | ~~R0123~~ | ~~R0123~~ | ~~R0123~~ | ~~R0123~~ |
| | ~~R0123~~ | ~~R0123~~ | ~~R0123~~ | ~~R4567~~ |
| | ~~R0123~~ | ~~R0123~~ | ~~R4567~~ | ~~R0123~~ |
| 311 | R0123 | R0123 | R4567 | R4567 |
| | ~~R0123~~ | ~~R4567~~ | ~~R0123~~ | ~~R0123~~ |
| 313 | R0123 | R4567 | R0123 | R4567 |
| 315 | R0123 | R4567 | R4567 | R0123 |
| | ~~R0123~~ | ~~R4567~~ | ~~R4567~~ | ~~R4567~~ |
| 317 | R4567 | R4567 | R0123 | R0123 |
| | ~~R4567~~ | ~~R4567~~ | ~~R0123~~ | ~~R4567~~ |
| | ~~R4567~~ | ~~R4567~~ | ~~R4567~~ | ~~R0123~~ |
| | ~~R4567~~ | ~~R4567~~ | ~~R4567~~ | ~~R4567~~ |

Figure 4

| MAC(L) 401 | MAC(R) 403 | ALU(L) 405 | ALU(R) 407 |
|---|---|---|---|
| R0123(a) | R0123(b) | R4567(a) | R4567(b) |
| R0123(a) | R4567(a) | R0123(b) | R4567(b) |
| R0123(a) | R4567(a) | R4567(a) | R0123(b) |
| R4567(a) | R4567(a) | R0123(a) | R0123(b) |

| Combinations | 2 | 2 | 3 | 2 |
|---|---|---|---|---|

Figure 5

| MAC(L) 501 | MAC(R) 503 | ALU(L) 505 | ALU(R) 507 |
|---|---|---|---|
| R0123(a) | R0123(b) | R4567(a) | R4567(b) |
| R4567(a) | R0123(b) | R0123(a) | R4567(b) |
| R0123(a) | R4567(a) | R4567(a) | R0123(b) |
| R4567(a) | R4567(a) | R0123(a) | R0123(b) |

| Combinations | 2 | 2 | 2 | 2 |
|---|---|---|---|---|

REDUCING MULTIPLEXER CIRCUITRY FOR OPERAND SELECT LOGIC ASSOCIATED WITH A PROCESSOR

CROSS REFERENCE TO RELATED APPLICATIONS

This application claims benefit of priority under 35 U.S.C. 119(e) of (i) U.S. Provisional Application No. 60/534,043 filed Jan. 2, 2004 and titled "REDUCING OPERAND SELECT LOGIC", the entirety of which is incorporated by reference for all purposes.

BACKGROUND OF THE INVENTION

1. Field of the Invention

The present invention relates to implementing a programmable chip using a reduced operand select logic. In one example, the present invention relates to methods and apparatus for efficiently implementing processor having processing blocks using reduced multiplexing circuitry.

2. Description of Related Art

Conventional processors such as Digital Signal Processing (DSP) processors include processing blocks that obtain data by accessing registers. Individual register data values are selected using multiplexing circuitry associated with operand select logic. For example, processing blocks such as arithmetic logic units (ALUs) and multiply accumulate units (MACs) each take two register values as input during a particular clock cycle. A register bank can include, for example, 16 data registers. A processor having an ALU and a MAC would select 4 values from the data registers as input during a particular clock cycle using multiplexers.

Typically, the ALU and MAC would use multiplexing circuitry including 4×16:1 multiplexers to select 4 data values from data registers during a particular cycle. However, using such a set of multiplexers can be inefficient. Mechanisms for using more efficient multiplexing circuitry are relatively limited.

Consequently, it is desirable to provide improved methods and apparatus for reducing the amount of resource allocated for handling selection logic in a processor.

SUMMARY OF THE INVENTION

Methods and apparatus are provided for reducing the amount of resources allocated for handling operand select logic in a processor. Characteristics associated with processing blocks are analyzed. Operand restrictions and register groups are configured to allow the use of more resource efficient multiplexing circuitry for operand select logic in a processor.

In one embodiment, a processor is provided. The processing includes multiple registers, a first processing block, and a second processing block. The multiple registers are arranged as multiple register groups. The first processing block is coupled to the plurality of groups of registers through multiplexing circuitry. The multiplexing circuitry includes more than one level of multiplexers. A second processing block is coupled to the plurality of groups of registers through multiplexing circuitry. The first processing block and the second processing block are configured to read a fixed number of registers from each of the plurality of register groups during each clock cycle.

In another embodiment, a programmable logic device is provided. The programmable logic device includes multiple registers, an arithmetic logic unit (ALU), and a multiply accumulate unit (MAC). The multiple registers are operable a multiple register groups. The ALU has multiple input lines. The multiple input lines are coupled to the plurality of registers through operand select logic. The operand select logic includes more than one level of multiplexers. The MAC has multiple input lines. The multiple input lines are coupled to the plurality of registers through operand select logic. The ALU and the MAC are configured to read a fixed number of registers from each of the plurality of register groups during each clock cycle.

In another embodiment, a method for providing register values is provided. A first register data value is provided to an arithmetic logic unit (ALU) through multiplexer circuitry. The first register data value is associated with a first register group. A second register data value is provided to the ALU through multiplexer circuitry. The second register data value is associated with a second register group. A third register data value is provided to a multiply accumulate unit (MAC) unit through multiplexer circuitry. The third register data value is associated with the first register group. A fourth register data value is provided to the MAC unit through multiplexer circuitry. The fourth register data value is associated with the second register group. The first, second, third, and fourth data values are provided during a single clock cycle.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 2 is a diagrammatic representation showing operand combinations for a processor MAC and ALU.

FIG. 3 is a diagrammatic representation showing a reduced set of operand combinations for a processor MAC and ALU.

FIG. 4 is a diagrammatic representation showing unique labels for different occurrences of register groups.

FIG. 5 is a diagrammatic representation showing a reduced set of unique labels for different occurrences of register groups.

DETAILED DESCRIPTION OF SPECIFIC EMBODIMENTS

Figure 1:
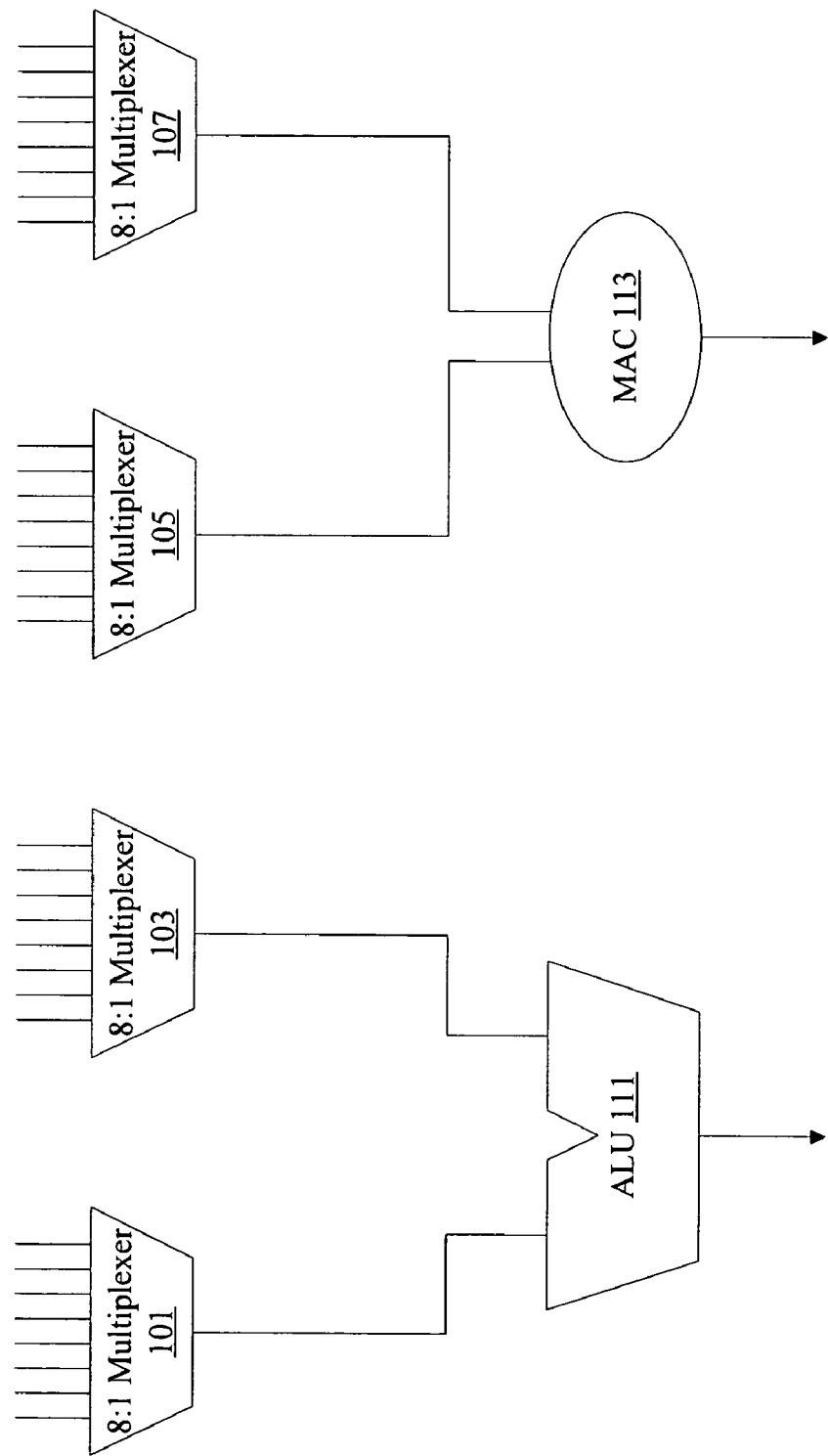
FIG. 1 is a diagrammatic representation showing a processor having multiplexer circuitry.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processing component is used in a variety of contexts. However, it will be appreciated that multiple processing components can also be used while remaining within the scope of the present invention.

For example, the techniques of the present invention will be described in the context of particular digital signal processors. However, it should be noted that the techniques of the present invention can be applied to a variety of different processors including general purpose processors, graphics accelerators, digital signal processors, cryptography accelerators, etc. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Many digital signal processing (DSP) processors and processing cores use execution units including at least a MAC and an ALU. In typical instances, both the ALU and MAC each require two register values on each clock cycle. In one embodiment, the DSP has 8 registers. By requiring two register values each, four 8:1 multiplexers are needed. That is, the ALU uses two 8:1 multiplexers to select two register values and the MAC uses two 8:1 multiplexers to select two register values. In conventional application specific integrated circuits (ASICs) and DSP processors, multiplexers are relatively easy and efficient to implement. In programmable chips however, multiplexers require more resources to implement.

On a programmable device supporting N registers, N:1 multiplexers require resources, e.g. a number of logic elements, that are proportional to N. Consequently, implementing four 8:1 multiplexers in a processor core on a programmable chip is relatively expensive.

However, the techniques of the present invention recognize that a reduced set of multiplexers can be used. In one example, resources devoted to implementing selection logic such as multiplexers can be improved by reducing the size of multiplexers required. Because the amount of resources varies proportionally based on N, the techniques of the present invention recognize that implementing a system using a larger number of smaller multiplexers can be substantially more efficient than implementing a system using larger multiplexers.

According to various embodiments, the MAC and ALU execution units are configured not use more than two registers from a group at any one time. This configuration allows the operand multiplexing required to be reduced from four 8:1 multiplexers to four 4:1 and 2:1 multiplexers. A single level of 8:1 multiplexers can be replaced using two levels of multiplexers where one level includes 4:1 multiplexers and a second level includes 2:1 multiplexers. Using multiple levels of multiplexers along with recognizing characteristics associated with input data, resources used for multiplexer logic can be substantially reduced.

FIG. 1 is a diagrammatic representation of one example of a processor having a MAC and an ALU with four 8:1 multiplexers 101, 103, 105, and 107. A device can be configured to support various numbers of registers such as 8, 16, 32, 48, 64, etc. In this example, 8 data registers are used for ease of representation. Each multiplexer is coupled to 8 registers and operable to select one of 8 register values to provide as an operand to a processing block. Any circuitry configured to perform an operation on data obtained from register values is referred to herein as a processing block. In one example, the two processing blocks are a multiply accumulate unit (MAC) 113 and an arithmetic logic unit (ALU) 111. It should be noted that other processing blocks are also contemplated. Four 8:1 multiplexers 101, 103, 105, and 107 are used in order to provide the MAC 113 and the ALU 111 with two operands each during any particular clock cycle. Separate multiplexers are used for each operand.

According to various embodiments, 8:1 multiplexers 101, 103, 105, and 107 are implemented using 5 logic elements. Multiplexer circuitry providing data from 8 registers to two processing blocks would require 20 logic elements along with their associated lookup tables. Any logic or mechanism used to implement operand select logic is referred to herein as multiplexer circuitry or multiplexer logic.

The techniques of the present invention recognize that resources allocated to operand select logic can be reduced by placing a few restrictions on operand arrangement. According to various embodiments, a set of 8 registers is divided into two groups, registers 1-4 and register 5-8, also referred to herein as R0123 and R4567. Any subset of data registers supported by a particular device is referred to herein as a register group, register subgroup or a subset of registers. In one example, data registers are divided into two register subgroups, R0123 including registers 0, 1, 2, and 3 and R4567 including registers 4, 5, 6, and 7. In some configurations, multiple banks of the same registers can be used.

FIG. 2 is a table representation showing the possible combinations of operands used by a device having an ALU and a MAC. In one example, a MAC left operand is read from group R0123 and the MAC right operand is read from group R4567. ALU left operand is read from group R0123 and the ALU right operand is read from group R4567. In another example, a MAC left operand is read from group R0123 and the MAC right operand is read from group R0123. ALU left operand is read from group R0123 and the ALU right operand is read from group R0123. FIG. 2 shows the possible combinations of operands. The techniques of the present invention recognize that there are particular characteristics of certain processing blocks. For example, the techniques of the present invention recognize that multiply accumulate (MAC) is commutative. Consequently, MAC(X,Y)=MAC(Y,X), so it is not necessary to consider MAC(L)=R4567, MAC(R)=R0123.

According to various embodiments, the MAC and the ALU are restricted to allow only at most two uses of each register group. For example, a MAC can read a left and a right operand out of register group R0123. In another example, an ALU can read a left and a right operand out of register group R0123. In yet another example, a MAC and an ALU can each read one operand out of register group R0123. According to various embodiments, algorithms are configured in a manner to allocate registers to meet these requirements. In some cases, this may lead to additional processing in order to assure that algorithms are configured so that only two reads of each register set are made during a particular clock cycle. In many instances, the additional preprocessing makes it counterintuitive to limit MAC and ALU operands to particular register groups. However, the techniques of the present invention recognize that the resulting reduced multiplexer complexity is often worth increasing algorithmic preprocessing.

FIG. 3 is a table showing one example of reduced operand arrangements made possible by restricting each register group, i.e. R0123 and R4567, to two uses each during a particular clock cycle. The left MAC operand 301, the right MAC operand 303, the left ALU operand 305, and the right ALU operand 307 can access each register group only twice during a particular clock cycle. Entry 311 shows register group R0123 accessed by left MAC operand 301 and right MAC operand 303 and register group R4567 accessed by left ALU operand 305 and the right ALU operand 307.

Entry 313 shows register group R0123 accessed by left MAC operand 301 and left ALU operand 305 and register group R4567 accessed by right MAC operand 303 and right ALU operand 307. Entry 315 shows register group R0123 accessed by left MAC operand 301 and right ALU operand 307 and register group R4567 accessed by right MAC operand 303 and left ALU operand 305. Entry 317 shows register group R0123 accessed by left ALU operand 305 and right ALU operand 307 and register group R4567 accessed by left MAC operand 301 and right MAC operand 303. The right and left ALU operands are herein also referred to as ALU(R) and ALU(L). The right and left MAC operands are herein also referred to as MAC(R) and MAC(L).

FIG. 4 is a table showing unique labels given to different occurrences of register groups R0123 and R4567. For example, R0123(a) refers to a first read of register group R0123 during a clock cycle and R0123(b) refers to a second read of the register group during the same clock cycle. Likewise, R4567(a) refers to a first read of register group R4567 during a clock cycle and R4567(b) refers to a second read of the register group during the same clock cycle. This allows operands drawn from the same sets to select different registers from those set.

Operand MAC(L) 401 is drawn from R0123(a) and R4567(a). Operand MAC(R) 403 is drawn from R0123(b) and R4567(a). Operand ALU(L) 405 is drawn from R0123(a), R0123(b), and R4567(a). Operand ALU(R) 407 is drawn from R0123(b) and R4567(b). Operands 401, 403, and 407 are each drawn from two labels. More specifically, MAC(L) 401 does a first read of R0123 of a first read of R4567. MAC(R) 403 does a second read of R0123 or a first read of R4567 during a particular clock cycle. ALU(R) 407 does a second read of R0123 or a second read of R4567. The above operands MAC(L) 401, MAC(R) 403, and ALU(R) 407 are selected from two possible options, e.g. first read of R0123 or a first read of R4567. However, as shown in FIG. 4, ALU(L) 405 is selected from three possible options—a first read of R0123, a second read of R0123, or a first read of R4567, suggesting the need for a 3:1 multiplexer.

However, the techniques and mechanisms of the present invention recognize that MAC is commutative. Consequently, the number of combinations or options can be reduced to two throughout as shown in FIG. 5. Operand MAC(L) 501 is drawn from R0123(a) and R4567(a). Operand MAC(R) 503 is drawn from R0123(b) and R4567(a). Operand ALU(L) 505 is drawn from R0123(a) and R4567(a). Operand ALU(R) 407 is drawn from R0123(b) and R4567(b). Operands 401, 403, 405 and 407 are each drawn from two labels. Since each operand can now be selected from one of two possible combinations or options, each input of the MAC or ALU need only be coupled to a 2:1 multiplexer.

Figure 6:
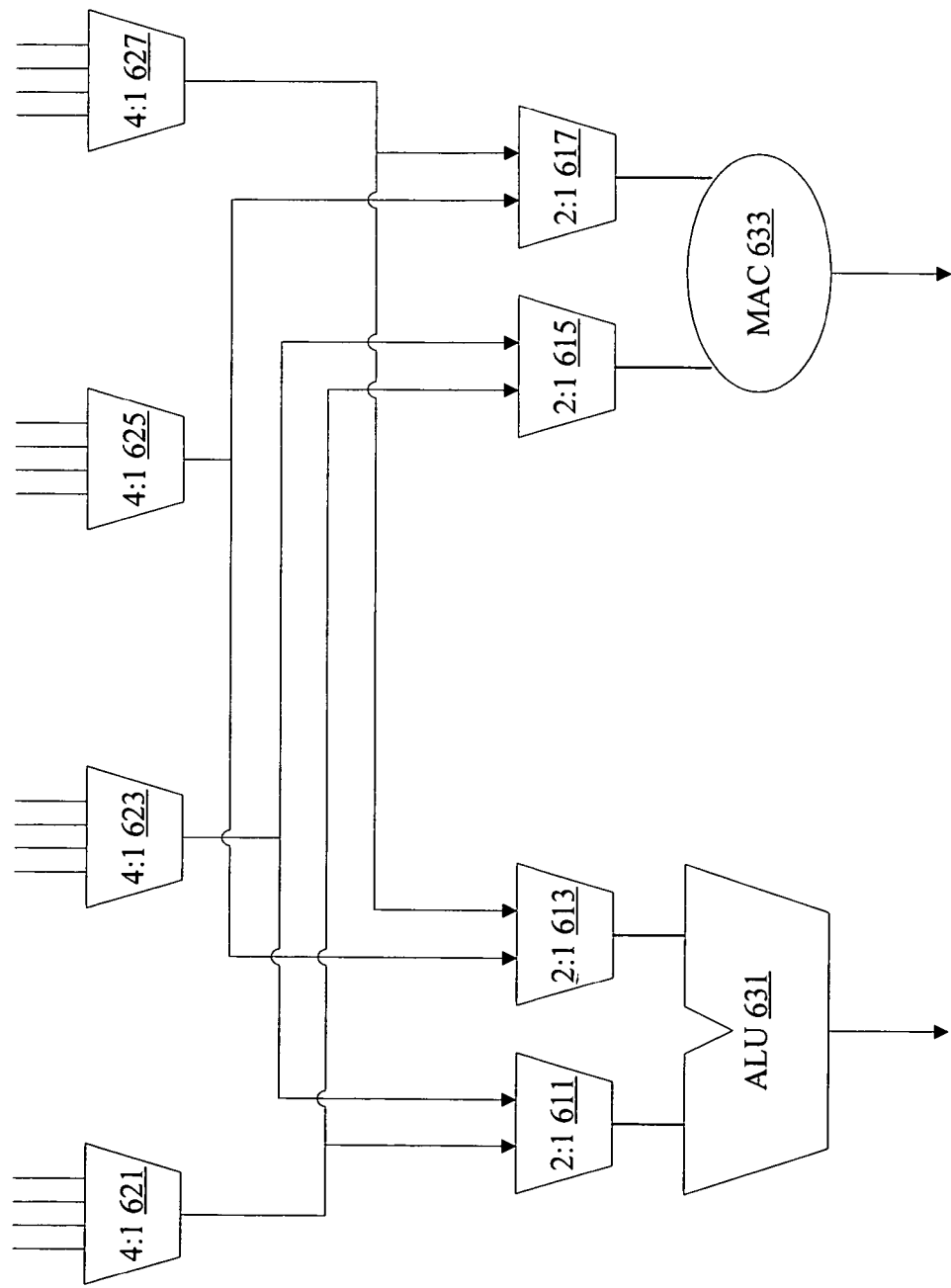
FIG. 6 is a diagrammatic representation showing one example of a reduced multiplexer implementation.

FIG. 6 is a diagrammatic representation showing one example of multiplexer circuitry. Multiplexer circuitry includes first level multiplexers 621, 623, 625, and 627. Any multiplexers selecting values from register subgroups are referred to herein as first level multiplexers. Multiplexer circuitry also includes second level multiplexer 611, 613, 615, and 617. Any multiplexer selecting values output by first level multiplexers is referred to herein as a second level multiplexer. In some examples, additional levels of multiplexers are provided. The left operand of the ALU 631 is selected using 2:1 multiplexer 611 from two labels—R0123(a) or R4567(a). A subgroup of registers selected from during a particular clock cycle is referred to herein as a label. The right operand of the ALU 631 is selected using 2:1 multiplexer 613 from R0123(b) or R4567(b). The left operand of the MAC 633 is selected using 2:1 multiplexer 615 from R0123(a) or R4567(a). The right operand of the MAC 633 is selected using 2:1 multiplexer 617 from R0123(b) or R4567(b).

By limiting the MAC and ALU execution units to two register access per register subgroup during any one clock cycle, operand multiplexing can be reduced from four 8:1 multiplexers to four 4:1 and four 2:1 multiplexers. According to various embodiments, 8:1 multiplexers are implemented using 5 logic elements, 4:1 multiplexers are implemented using 2 logic elements, and a 2:1 uses only 1 logic element. Consequently, the number of logic elements needed for operand selection can be reduced in one embodiment by 40%.

Although the techniques and mechanisms of the present invention are applicable to a variety of different processing systems, the techniques and mechanisms of the present invention are particularly applicable to programmable chips and programmable chip systems.

Figure 7:
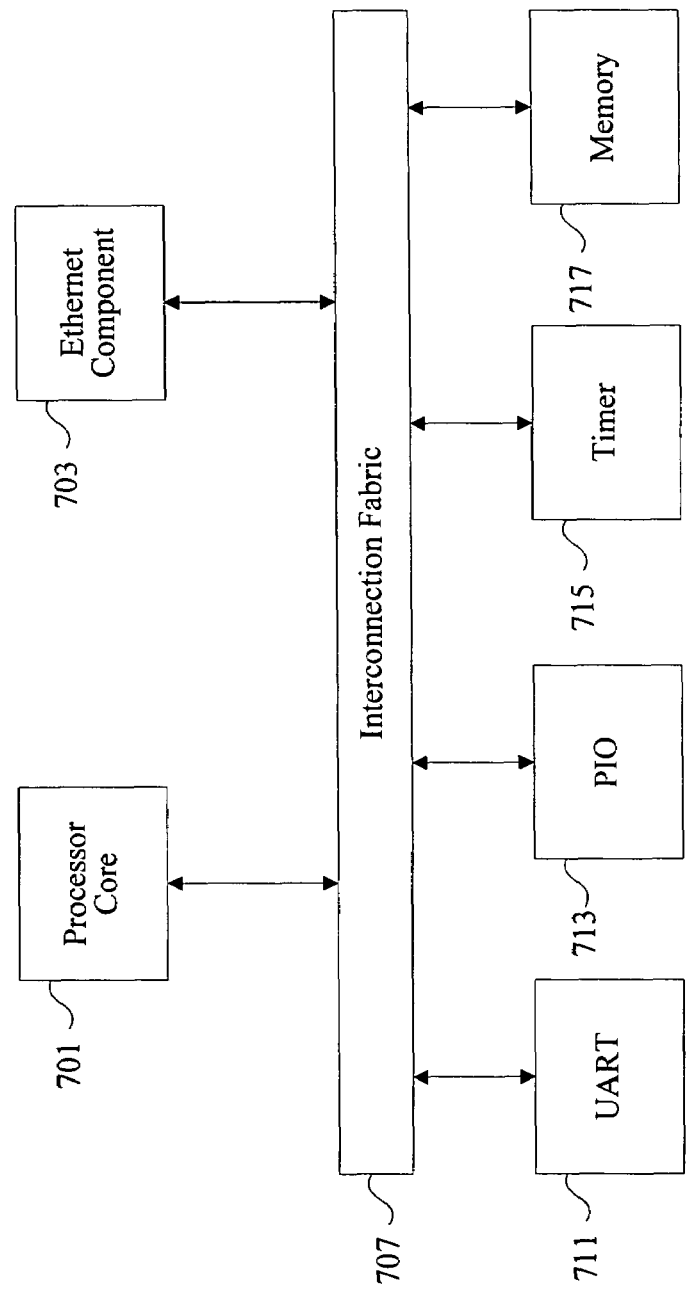
FIG. 7 is a diagrammatic representation of a programmable chip.

FIG. 7 is a diagrammatic representation showing one example of a system on a programmable chip that can used the techniques of the present invention. In one example, the programmable chip can be implemented as a device without a processor core. In other examples, the system includes a processor core, as well as hardware accelerators, ALUs, MACs, peripheral devices, and peripheral interfaces. In one example, the system on a programmable chip includes processor core 701 and an Ethernet component 703 as well as peripheral components UART 711, PIO 713, timer 715, and data memory 717. In some examples, the Ethernet component 703 is instead a Digital Signal Processing (DSP) core, a cryptography accelerator, or a video processor.

It should be noted that the system can include both on-chip memory 717 and off-chip memory. In one example, the data memory 717 can support variable latency or fixed latency access. The components are interconnected using an interconnection fabric 707. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 8:
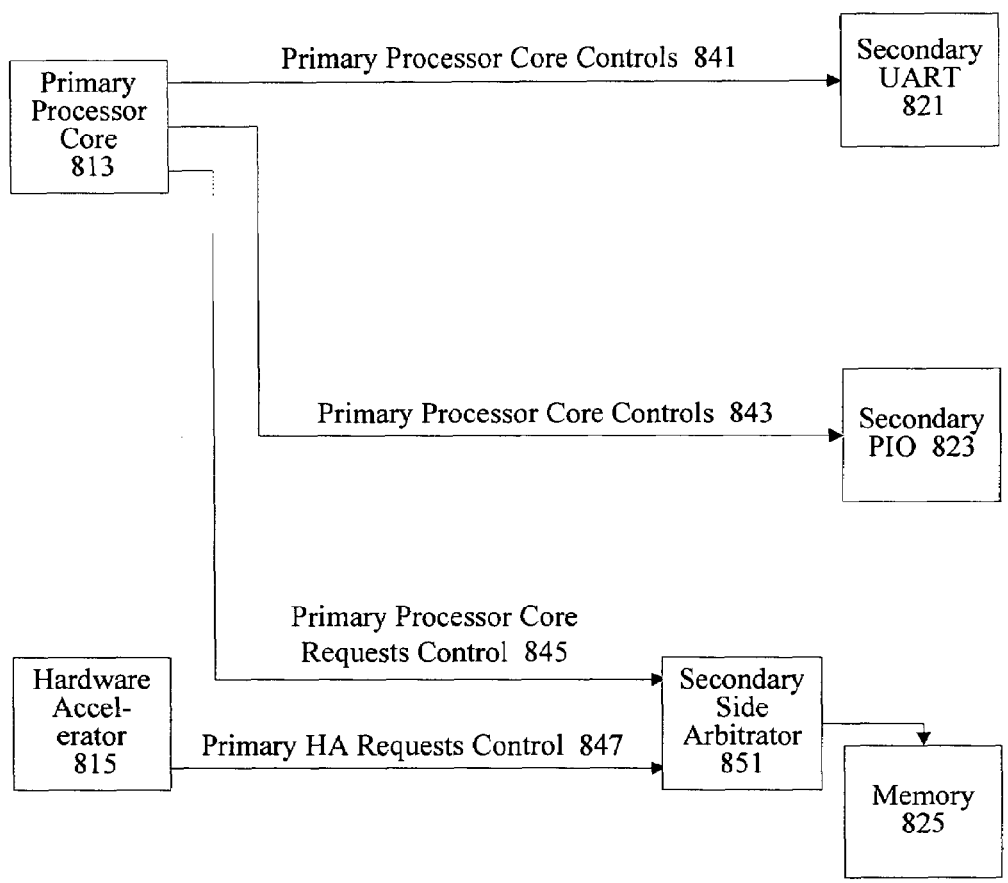
FIG. 8 is a diagrammatic representation showing an interconnection fabric.

FIG. 8 is a diagrammatic representation showing one example of a system using secondary side arbitration, sometimes referred to as slave side arbitration, simultaneous multiple primary components, or simultaneous multiple masters.

A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 825 is associated with a secondary side arbitrator 851. However, secondary components UART 821 and PIO 823 are not associated with any arbitrator. In one example, secondary component UART 821 and secondary PIO 823 can only be accessed by primary CPU 813 and not by primary Ethernet device 815. A secondary memory component 825, however, can be accessed by both primary CPU 813 and primary Ethernet device 815.

According to various embodiments, a secondary side arbitrator 851 allows a first secondary component in a system to be accessed by a first primary component at the same time a second secondary component in the system is accessed by a second primary component. For example, peripheral interface 825 can be accessed by primary Ethernet 815 through secondary side arbitrator 851 at the same time, secondary UART 821 is accessed by primary CPU 813.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 9:
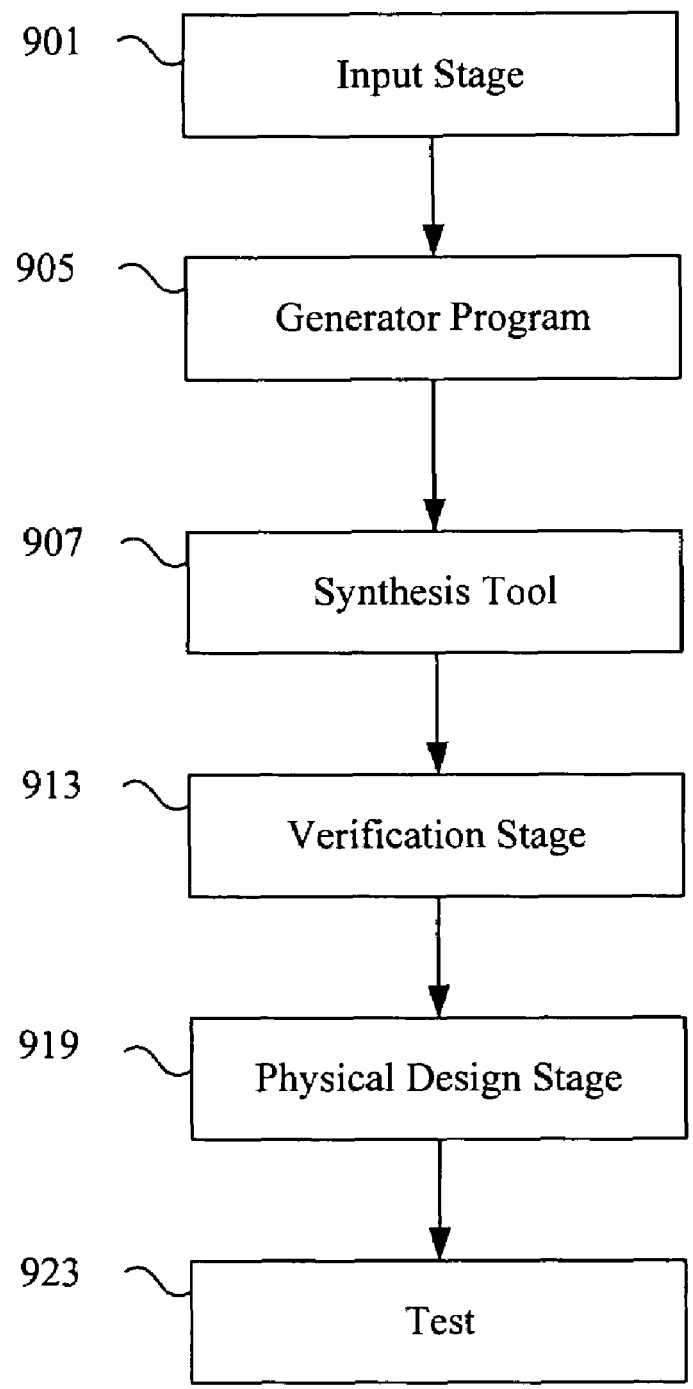
FIG. 9 is a diagrammatic representation showing a technique for implementing the programmable chip.

FIG. 9 is a diagrammatic representation showing implementation of a system on a programmable chip. An input stage 901 receives selection information typically from a user for logic such as a processor core as well as other components such as a streaming output device to be implemented on an electronic device. In one example, the input received is in the form of a high-level language program. A generator program 905 creates a logic description and provides the logic description along with other customized logic to any of a variety of synthesis tools, place and route programs, and logic configuration tools to allow a logic description to be implemented on an electronic device.

In one example, an input stage 901 often allows selection and parameterization of components to be used on an electronic device. The input stage 901 also allows configuration of variable or fixed latency support. In some examples, components provided to an input stage include intellectual property functions, megafunctions, and intellectual property cores. The input stage 901 may be a graphical user interface using wizards for allowing efficient or convenient entry of information. The input stage may also be a text interface or a program reading a data file such as a spreadsheet, database table, or schematic to acquire selection information. The input stage 901 produces an output containing information about the various modules selected.

In typical implementations, the generator program 905 can identify the selections and generate a logic description with information for implementing the various modules. The generator program 905 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 905 identifies pointers and provides ports for each pointer. One tool with generator program capabilities is System on a Programmable Chip (SOPC) Builder available from Altera Corporation of San Jose, Calif. The generator program 905 also provides information to a synthesis tool 907 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 909.

As will be appreciated by one of skill in the art, the input stage 901, generator program 905, and synthesis tool 907 can be separate programs. The interface between the separate programs can be a database file, a log, or simply messages transmitted between the programs. For example, instead of writing a file to storage, the input stage 901 can send messages directly to the generator program 905 to allow the generator program to create a logic description. Similarly, the generator program can provide information directly to the synthesis tool instead of writing HDL files. Similarly, input stage 901, generator program 905, and synthesis tool 907 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 907.

A synthesis tool 907 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 913 typically follows the synthesis stage 907. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 913, the synthesized netlist file can be provided to physical design tools 919 including place and route and configuration tools. A place and route tool typically locates logic cells on specific logic elements of a target hardware device and connects wires between the inputs and outputs of the various logic elements in accordance with logic required to implement an electronic design. The device can also be physically tested at 923.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 901, the generator program 905, the synthesis tool 907, the verification tools 913, and physical design tools 919 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 10:
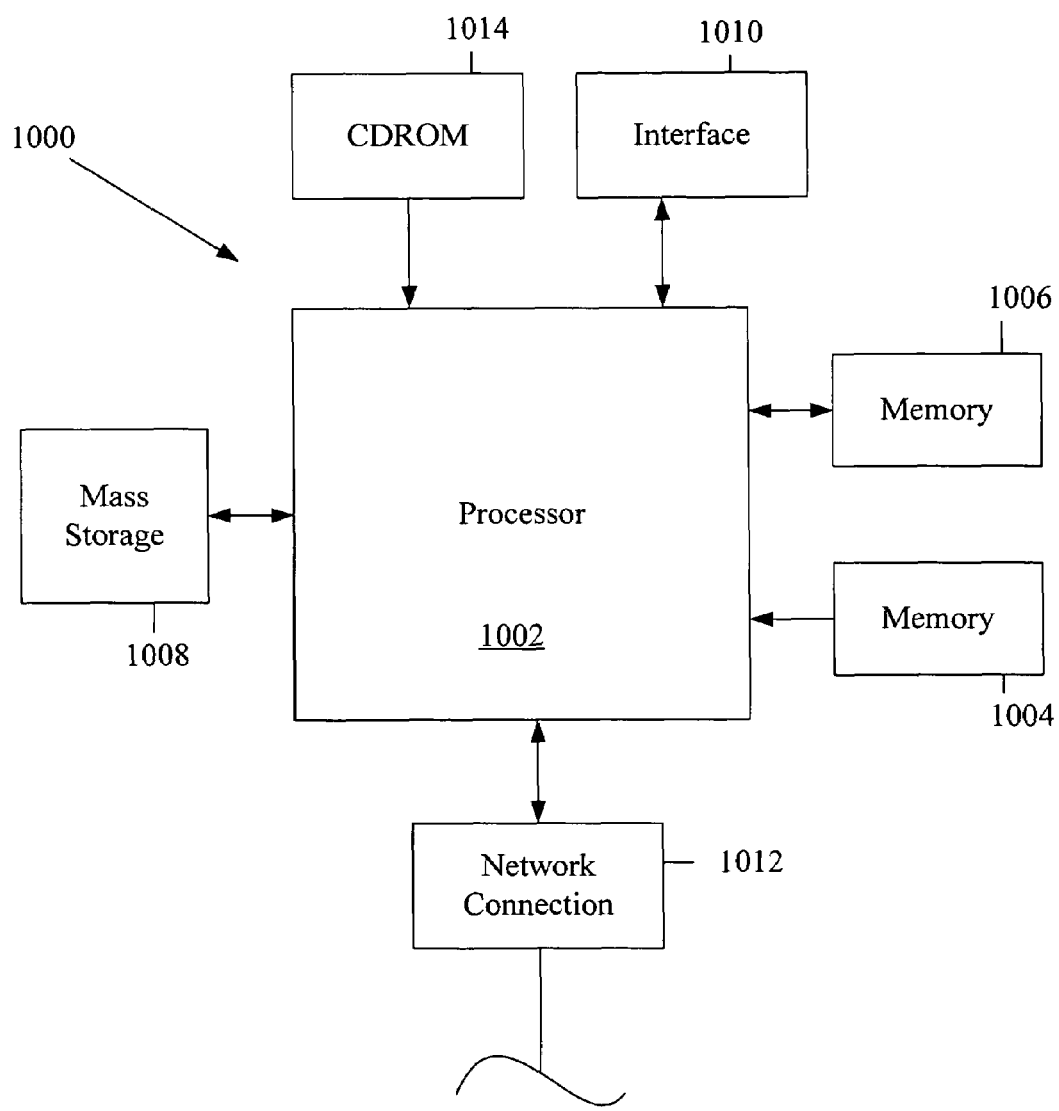
FIG. 10 is a diagrammatic representation depicting a computer system.

FIG. 10 illustrates a typical computer system that can be used to implement a programmable chip. The computer system 1000 includes any number of processors 1002 (also referred to as central processing units, or CPUs) that are coupled to devices including memory 1006 (typically a random access memory, or "RAM"), memory 1004 (typically a read only memory, or "ROM"). The processors 1002 can be configured to generate a test sequences for any designated processor. As is well known in the art, memory 1004 acts to transfer data and instructions uni-directionally to the CPU and memory 1006 is used typically to transfer data and instructions in a bi-directional manner.

Both of these memory devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than memory. The mass storage device 1008 can be used to hold a library or database of prepackaged logic or intellectual property functions, as well as information on generating particular configurations. It will be appreciated that the information retained within the mass storage device 1008, may, in appropriate cases, be incorporated in standard fashion as part of memory 1006 as virtual memory. A specific mass storage device such as a CD-ROM 1014 may also pass data uni-directionally to the CPU.

CPU 1002 is also coupled to an interface 1010 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to a computer or telecommunications network using a network connection as shown generally at 1012. With such a network connection, it is contemplated that the CPU might receive information from the network, or might output information to the network in the course of performing the above-described method steps. It should be noted that the system 1000 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1008 or 1014 and executed on CPU 1008 in conjunction with primary memory 1006.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A processor, comprising:
    a plurality of registers, the plurality of registers arranged as a plurality of register groups including a first subset of registers and a second subset of registers, the second subset of registers including at least two registers not included in the first subset of registers;
    a first processing block having a first processing block first operand and a first processing block second operand coupled to the plurality of groups of registers through multiplexing circuitry, the multiplexing circuitry including more than one level of multiplexers,
    a second processing block having a first processing block first operand and a first processing block second operand coupled to the plurality of groups of registers through multiplexing circuitry, wherein the multiplexing circuitry allows the first processing block first operand, the first processing block second operand, the second processing block first operand, and the second processing block second operand only a total of two reads from the first subset of registers and only a total of two reads from the second subset of registers during a particular clock cycle.

2. The processor of claim 1, wherein the first processing block is an arithmetic logic unit (ALU).

3. The processor of claim 1, wherein the second processing block is a multiply accumulate unit (MAC).

4. The processor of claim 3, wherein the plurality of registers includes 8 registers.

5. The processor of claim 3, wherein the plurality of registers are arranged as two groups of registers.

6. The processor of claim 5, wherein the multiply accumulate unit and the arithmetic logic unit are configured to read two registers from each of the two groups of registers during a particular clock cycle.

7. The processor of claim 1, wherein multiplexing circuitry comprises two levels of multiplexers.

8. The processor of claim 1, wherein the first level of multiplexers comprises 4:1 multiplexers.

9. The processor of claim 8, wherein the first level comprises 4×4:1 multiplexers.

10. The processor of claim 8, wherein the second level of multiplexers comprises 2:1 multiplexers.

11. The processor of claim 10, wherein the second level comprises 4×2:1 multiplexers.

12. The processor of claim 1, wherein the processor is a digital signal processor.

13. The processor of claim 12, wherein the processor is implemented on a programmable chip.

14. A programmable logic device, comprising:
    a plurality of registers, the plurality of registers arranged as a plurality of register groups including a first subset of registers and a second subset of registers, the second subset of registers including at least two registers not included in the first subset of registers;
    an arithmetic logic unit (ALU) having multiple input lines including an ALU first operand and an ALU second operand, the multiple input lines coupled to the plurality of registers through operand select logic, the operand select logic including more than one level of multiplexers;
    a multiply accumulate unit (MAC) having multiple input lines including a MAC first operand and a MAC second operand, the multiple input lines coupled to the plurality of registers through operand select logic, wherein the operand select logic allows the ALU first operand, the ALU second operand, the MAC first operand, and the MAC second operand only a total of two reads from the first subset of registers and only a total of two reads from the second subset of registers during a particular clock cycle.

15. The processor of claim 14, wherein the plurality of registers includes 8 registers.

16. The processor of claim 14, wherein the plurality of registers are arranged as two groups of registers.

17. The processor of claim 16, wherein the MAC and the ALU are configured to read two registers from each of the two groups of registers during a particular clock cycle.

18. The processor of claim 14, wherein operand select logic comprises two levels of multiplexers.

19. The processor of claim 14, wherein the first level of multiplexers comprises 4:1 multiplexers.

20. The processor of claim 19, wherein the first level comprises 4×4:1 multiplexers.

21. The processor of claim 19, wherein the second level of multiplexers comprises 2:1 multiplexers.

22. The processor of claim 21, wherein the second level comprises 4×2:1 multiplexers.

23. A method for providing register values, the method comprising:
    outputting a first register data value to an arithmetic logic unit (ALU) through multiplexer circuitry, the first register data value associated with a first register group;
    outputting a second register data value to the ALU through multiplexer circuitry, the second register data value associated with a second register group including at least two registers not included in the first register group;
    outputting a third register data value to a multiply accumulate unit (MAC) unit through multiplexer circuitry, the third register data value associated with the first register group;

outputting a fourth register data value to the MAC unit through multiplexer circuitry, the fourth register data value associated with the second register group;

wherein the multiplexer circuitry allows only two register data values associated with the first register group and only two register data values associated with the second register group to be provided to the ALU and the MAC during a particular clock cycle.

24. The method of claim 23, wherein multiplexer circuitry comprises two levels of multiplexers.

25. The method of claim 23, wherein the register data values are provided from a bank of 8 registers.

26. The processor of claim 25, wherein the first level of multiplexers comprises 4:1 multiplexers.

27. The processor of claim 26, wherein the second level of multiplexers comprises 2:1 multiplexers.

28. Circuitry for providing register values, the circuitry comprising:

means for outputting a first register data value to an arithmetic logic unit (ALU) through multiplexer circuitry, the first register data value associated with a first register group;

means for outputting a second register data value to the ALU through multiplexer circuitry, the second register data value associated with a second register group including at least two registers not included in the first register group;

means for outputting a third register data value to a multiply accumulate unit (MAC) unit through multiplexer circuitry, the third register data value associated with the first register group;

means for outputting a fourth register data value to the MAC unit through multiplexer circuitry, the fourth register data value associated with the second register group;

wherein the multiplexer circuitry allows only two register data values associated with the first register group and only two register data values associated with the second register group to be provided to the ALU and the MAC during a particular clock cycle.

* * * * *